(12) United States Patent
Cheng et al.

(10) Patent No.: US 8,419,079 B2
(45) Date of Patent: Apr. 16, 2013

(54) LATCH MECHANISM

(75) Inventors: Lung-Pai Cheng, Taipei (TW);
Yun-Tang Lin, Taipei (TW);
Wei-Hsiang Lu, Taipei (TW)

(73) Assignee: Inventec Corporation, Taipei (TW)

( * ) Notice: Subject to any disclaimer, the term of this patent is extended or adjusted under 35 U.S.C. 154(b) by 425 days.

(21) Appl. No.: 12/714,648

(22) Filed: Mar. 1, 2010

(65) Prior Publication Data

US 2011/0072725 A1 Mar. 31, 2011

(30) Foreign Application Priority Data

Sep. 30, 2009 (TW) ................................ 98133261 A

(51) Int. Cl.
*E05C 1/10* (2006.01)
*E05C 19/00* (2006.01)

(52) U.S. Cl.
USPC ........................................... 292/42; 292/302

(58) Field of Classification Search ........... 292/DIG. 11, 292/DIG. 50, DIG. 62, 2, 3, 8, 14, 16, 24, 292/25, 30–33, 41–43, 95, 116, 117, 119, 292/120, 96, 101, 106, 121, 122, 127, 128, 292/137, 138, 145, 150, 156, 157, 162, 174, 292/175, 300, 302, 1, 163, 164, 341.15, DIG. 37, 292/DIG. 38, DIG. 48, DIG. 63, DIG. 71; 429/96, 97, 100; 70/63–76, DIG. 42, DIG. 80; 361/679.57, 679.58; 312/295, 310
See application file for complete search history.

(56) References Cited

U.S. PATENT DOCUMENTS

| | | | | |
|---|---|---|---|---|
| 259,601 A * | 6/1882 | Swanson | ......................... | 292/30 |
| 336,316 A * | 2/1886 | Hillery | ............................. | 292/42 |
| 1,023,391 A * | 4/1912 | Parsons | ......................... | 292/33 |
| 1,179,712 A * | 4/1916 | Fournier | ....................... | 292/156 |
| 1,655,525 A * | 1/1928 | Underwood | ................... | 396/536 |
| 3,086,830 A * | 4/1963 | Malia | ............................. | 312/200 |
| 3,150,902 A * | 9/1964 | Naab et al. | ..................... | 312/217 |
| 3,160,431 A * | 12/1964 | Anderson et al. | ............... | 292/42 |
| 4,740,020 A * | 4/1988 | Williams | ........................ | 292/41 |
| 4,962,800 A * | 10/1990 | Owiriwo | ........................ | 150/118 |
| 6,510,301 B2 * | 1/2003 | Tanaka | .......................... | 399/125 |
| 7,885,064 B2 * | 2/2011 | Chen et al. | ............... | 361/679.58 |

* cited by examiner

*Primary Examiner* — Thomas Beach
*Assistant Examiner* — Alyson M Merlino
(74) *Attorney, Agent, or Firm* — J.C. Patents

(57) ABSTRACT

A latch mechanism including a housing, a first device, a first sliding member, a second sliding member, a stopping portion and a second device is provided. The first and second devices and the first and second sliding members are disposed on the housing, wherein the first sliding member is located between the first device and the second sliding member. The stopping portion is disposed on at least one of the first device and the first sliding member for restricting a sliding distance of the first sliding member relative to the first device. The first sliding member is not allowed to drive the second sliding member to slide relative to the housing along a first direction to disengage the second device when sliding until the first device is detached from the housing and the engagement between the first device and the first sliding member is released.

10 Claims, 5 Drawing Sheets

LATCH MECHANISM

CROSS-REFERENCE TO RELATED APPLICATION

This application claims the priority benefit of Taiwan application serial no. 98133261, filed on Sep. 30, 2009. The entirety of the above-mentioned patent application is hereby incorporated by reference herein and made a part of this specification.

BACKGROUND OF THE INVENTION

1. Field of the Invention

The invention relates to a latch mechanism. More particularly, the invention relates to a latch mechanism applied to an electronic device.

2. Description of Related Art

In a conventional electronic device (e.g. a notebook computer), a cover is usually bonded to a housing of the notebook computer, so as to embellish the overall notebook computer.

Fixing members such as screws are usually used to fix the cover onto the housing. However, fixing members would make holes on the housing, which affects the overall appearance of the electronic device. Moreover, when users want to disassemble the cover from the housing, several hand tools are needed to take off the fixing members; likewise, when users want to assemble the cover and the housing together, the hand tools are needed as well, which is rather inconvenient for the users.

SUMMARY OF THE INVENTION

The invention provides a latch mechanism being applied to the electronic device.

A latch mechanism including a housing, a first device, a first sliding member, a second sliding member, a stopping portion and a second device is provided. The first device, the first sliding member, the second sliding member and the second device are disposed on the housing, wherein the first sliding member is located at a side of the first device, and the second sliding member is located aside the first sliding member. The stopping portion is disposed on at least one of the first device and the first sliding member for restricting a sliding distance of the first sliding member relative to the first device, so as to engage the first device and the first sliding member together. The first sliding member slides relative to the housing and is not allowed to drive the second sliding member to slide relative to the housing along a first direction to disengage the second device until the first device is detached from the housing and the engagement between the first device and the first sliding member is released.

In an embodiment, the first sliding member has a first locking hook, the first device has a second locking hook, and when the first sliding member is located on a first locking position, the first locking hook is engaged with the second locking hook. In addition, the first locking hook has a first guiding surface, the first device has a second guiding surface, and the first guiding surface and the second guiding surface are matched, such that the first device is detached from the housing along a second direction perpendicular to the first direction. When the first sliding member is located on the first locking position, the second sliding member and the first sliding member are spaced apart from each other by a distance. Furthermore, the stopping portion is disposed at an end of the first sliding member away from the first locking hook, and when the first sliding member is located on the first locking position, the stopping portion and the first device are spaced apart from each other by a distance.

In an embodiment, the stopping portion is a stopping bump disposed on the first device and located on a moving path of the first sliding member.

In an embodiment, the second sliding member has a third locking hook, the second device has a fourth locking hook, and when the second sliding member is located on a second locking position, the third locking hook is engaged with the fourth locking hook. In addition, the third locking hook has a third guiding surface, the second device has a fourth guiding surface, and the third guiding surface and the fourth guiding surface are matched, such that the second device is detached from the housing along a third direction perpendicular to the first direction.

In an embodiment, the housing has a plurality of guiding pins, both of the first sliding member and the second sliding member have a locating slot respectively, and the guiding pins are correspondingly settled in the locating slots of the first sliding member and the second sliding member, to restrict the first sliding member and the second sliding member from sliding relative to the housing along the first direction. Based on the description above, a user changes or assembles elements such as memory cards in the electronic device after the first device such as a battery is detached from the housing, so that the electrical connection between the first device and the electronic device is cut off, and therefore a damage for the elements may caused by electrically burning is prevented. The electronic device using the latch mechanism is operated normally then.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention.

DESCRIPTION OF EMBODIMENTS

Figure 1:
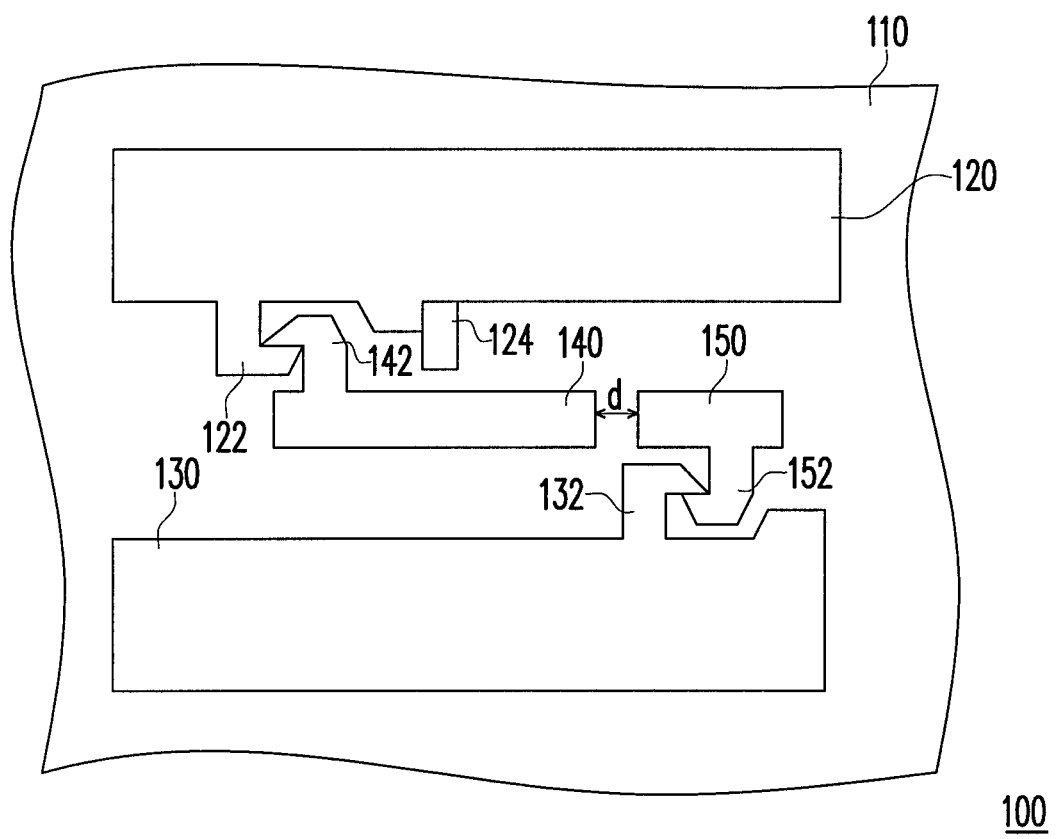
FIG. 1 is a schematic view of a latch mechanism according to the present invention.

FIG. 1 is a schematic view of a latch mechanism according to the present invention. Referring to FIG. 1, the latch mechanism 100 can be applied to electronic devices such as a notebook. The latch mechanism 100 includes a housing 110, a first device 120, a second device 130, a first sliding member 140, a stopping portion 124 and a second sliding member 150. The first device 120, the second device 130, the first sliding member 140 and the second sliding member 150 are all disposed on the housing 110. The first sliding member 140 is located between the first device 120 and the second device 130. The second sliding member 150 is disposed beside the first sliding member 140 and located on a moving path of the first sliding member 140. The first sliding member 140 is engaged with the first device 120, and second sliding member 150 is engaged with the second device 130. In addition, the stopping portion 124 is disposed on the first device 120, wherein the stopping portion 124 limits a sliding distance of the first sliding member 140 in sliding relative to the first device 120, and the stopping portion 124 engages the first device 120 and the first sliding member 140 together.

The first sliding member 140 has a first locking hook 142, the first device 120 has a second locking hook 122, and the first locking hook 142 is engaged with the second locking hook 122 to fix the first device 120 onto the housing 110. In the present embodiment, the first device 120 is a battery. In addition, the stopping portion 124 is a stopping bump disposed on the first device 120 and located on the moving path of the first sliding member 140 to limit the sliding distance of the first sliding member 140.

Referring to FIG. 1, the second sliding member 150 has a third locking hook 152, the second device 130 has a fourth locking hook 132, and the third locking hook 152 is engaged with the fourth locking hook 132. By which, the second sliding member 150 fixes the second device 130 onto the housing 110. In the present embodiment, the second device 130 is a cover.

Referring to FIG. 1, when the first sliding member 140 is located on a first locking position, the first device 120 is fixed on the housing 110 by the first sliding member 140, and the first sliding member 140 and the second sliding member 150 are spaced apart from each other by a distance d.

Furthermore, the housing 110 has a guiding pin 112, and the sliding element 140 has a locating slot 144 in which the guiding pin 112 is disposed, so as to restrict a moving direction and a moving distance of the first sliding element 140 relative to the housing 110.

Figure 2:
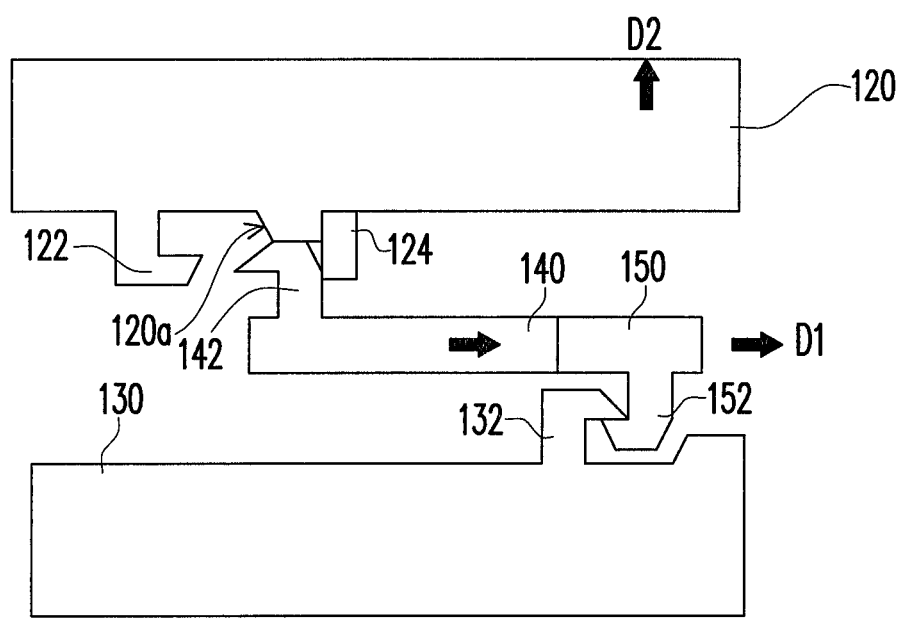
FIG. 2 shows a first sliding member of the latch mechanism of FIG. 1 sliding in a distance.

FIG. 2 shows the first sliding member of the latch mechanism of FIG. 1 sliding in a distance. Referring to FIG. 2, the first sliding member 140 slides relative to the housing 110 along the first direction D1 and disengages from the first device 120 after the first locking hook 142 of the first sliding member 140 departs from the second locking hook 122 of the first device 120. A knob can be disposed on the external surface of the housing 110 (i.e. the surface opposite to the inner surface whereon the first sliding member 140 and the second sliding member 150 are disposed) and connected to the first sliding member 140, such that the first sliding member 140 can be driven by pushing the knob. At this time, the first device 120 departs from the housing 110.

Moreover, the first locking hook 142 has a first guiding surface 142a, and the first device 120 has a second guiding surface 120a, such that when the first sliding member 140 slides relative to the housing 110 along the first direction D1 in a distance, the first device 12U can be driven to move along a second direction D2 perpendicular to the first direction D1 by the cooperation of the first guiding surface 142a and the second guiding surface 122a. The moving distance of the first sliding member 140 is equal to the distance d between the first sliding member 140 and the second sliding member 150 as the first sliding member 140 on the second locking position. It is noted that, until the first device 120 is removed from the housing, the stopping portion can be configured to prohibit the first sliding member 140 from sliding along the first direction D1 and driving the second sliding member 150 even if the first sliding member 140 is maintained being pushed. In the case that if the first device 120 needs to be detached from the housing 110 alone, such configuration can prevent the second device 130 from being drawn out of the housing 110 (illustrated in FIG. 1) together with detachment of the first device 120.

Figure 3:
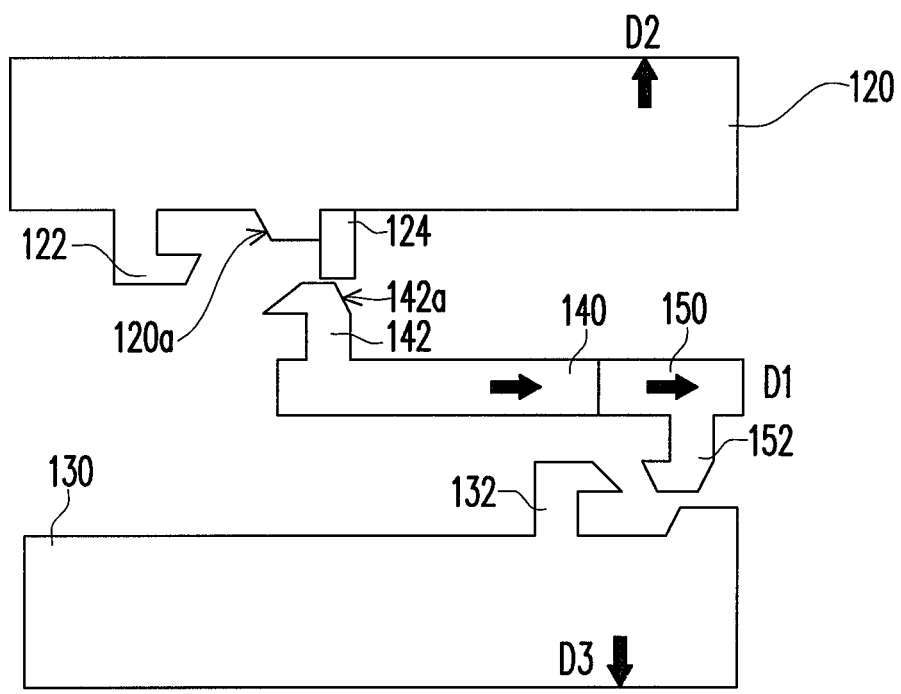
FIG. 3 shows the first sliding member being pushed along a first direction to drive a second sliding member to slide.

FIG. 3 shows the first sliding member being pushed along a first direction to drive a second sliding member to slide. Referring to FIG. 3, after the first device 120 is detached from the housing 110, the first sliding member 140 continues to slide and drive the second sliding member 150 to slide relative to the housing 110 along the first direction D1, and then the engagement between the second sliding member 150 and the second device 130 is released. Likewise, the third locking hook 152 of the second sliding member 150 has a third guiding surface 152a, and the second device 130 has a fourth guiding surface 130a. When the second sliding member 150 slides along the first direction D1, the engagement between the third locking hook 152 and the fourth locking hook 132 is released by the cooperation of the third guiding surface 152a and the fourth guiding surface 130a, and the second device 130 departs from the housing 110 along a third direction D3.

Figure 4:
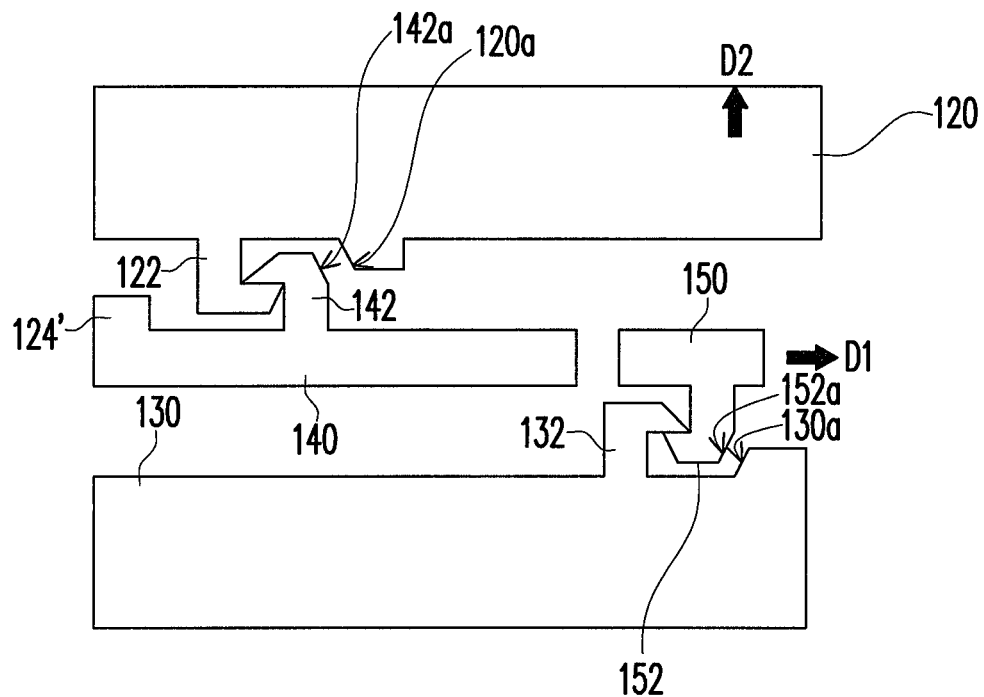
FIG. 4 is a schematic view of the first sliding member according to another embodiment of the present invention.

FIG. 4 is a schematic view of the first sliding member according to another embodiment of the present invention. Alternatively, referring to FIG. 4, the stopping portion 124' can also be disposed on the first sliding member 140. The stopping portion 124' and the first sliding member 140 can be integrally formed, wherein the stopping portion 124' is disposed at an end of the first sliding member 140 away from the second sliding member 150, and when the first sliding member 140 is located on the first locking position, the stopping portion 124' and the first device 120 are spaced apart from each other by a distance. In the present embodiment, the stopping portion 124' is in an L shape. Accordingly, when the first sliding member 140 slides along the first direction D1, engagement between the second locking hook 122 of the first device 120 and the stopping portion 124' can limit the sliding distance of the first sliding member 140. Certainly, according to other embodiments that are not shown herein, the first device 120 can be provided with the stopping portion 124 as well as the first sliding member 140 can be provided with the stopping portion 124', which depends on requirements.

Figure 5:
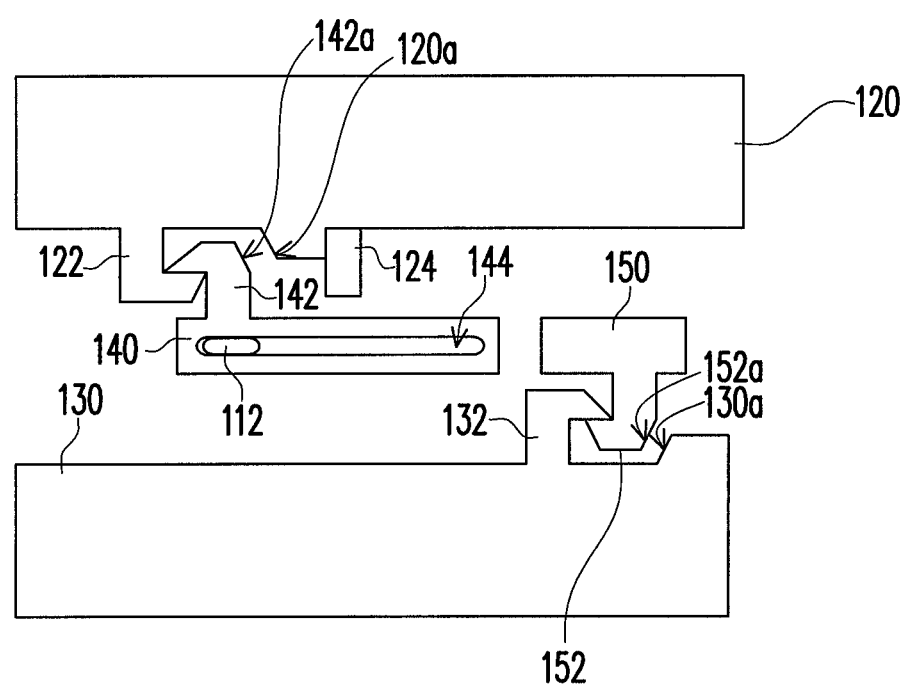
FIG. 5 is a schematic view of the first sliding member according to further another embodiment of the present invention.

FIG. 5 is a schematic view of the first sliding member according to further another embodiment of the present invention. Referring to FIG. 5, the first sliding 140 can further has a locating slot 144, and the housing has a guiding pin 112, wherein the guiding pin 112 and the locating slot 144 are matched to drive the first sliding member 140 moves along the first direction D1 rather than other directions inclined relative to the housing 110 or those different from the first direction D1. Arrangements and profiles of the locating slot and guiding pins can also be changed as required, and are not limited herein. Likewise, the second sliding member 150 can also be provided with a locating slot, which is matched with a guiding pin on the housing 110. Since the arrangements of the locating slot of the second sliding member 150 and the guiding pin of the housing 110 is similar to those applied to the first sliding member 140, detailed descriptions are omitted herein.

To sum up, in the latch mechanism of the invention, the stepping motion of two sliding element results in disassembly of the first device and the second device from the housing, respectively. Firstly, the engagement between the locking hooks of the first sliding member and the first device is released by sliding the first sliding member, to detach the first device from the housing. Then, the first sliding member continues to slide and drives the second sliding member moving to release the engagement between the second sliding member and the second device, and thereby the second device can be detached from the housing. In addition, the first sliding member is restrict from sliding along the first direction and driving the second sliding member to disengage the second device until the first device is detached from the housing. Therefore, the engagement between the first sliding member and the first device should be released first, i.e. detaching the first device from the housing first, and then the engagement between the second device and the second sliding member can be released. In a case that the first device is a battery and the second device is a cover, the process of detaching the battery before detaching the cover can prevent a damage of burning elements which are applied onto an electronic device such as a notebook computer and ensure the electronic device applying the latch mechanism being operated normally.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A latch mechanism, comprising:
   a housing;
   a first device, disposed on the housing;
   a first sliding member, disposed on the housing and located at a side of the first device, such that an engagement between the first device and the first sliding member occurs when the first sliding member is located in a first locking position;
   a second device, disposed on the housing;
   a second sliding member, disposed on the housing and located aside the first sliding member, such that an engagement between the second device and the second sliding member occurs when the second sliding member is located in a second locking position; and
   a stopping portion, disposed on the first device for restricting a sliding distance of the first sliding member relative to the first device,
   wherein the first sliding member slides in a first direction towards the second sliding member to release the engagement between the first device and the first sliding member and so as to detach the first device from the housing in a second direction perpendicular to the first direction, the first sliding member further continues sliding towards and pushes the second sliding member to slide in the first direction, so as to release the engagement between the second sliding member and the second device.

2. The latch mechanism of claim 1, wherein the first sliding member has a first locking hook, the first device has a second locking hook, and when the first sliding member is located in the first locking position, the first locking hook is engaged with the second locking hook.

3. The latch mechanism of claim 2, wherein the first locking hook has a first guiding surface, the first device has a second guiding surface, and the first guiding surface and the second guiding surface are cooperate with each other, such that the first device is detached from the housing along a second direction perpendicular to the first direction.

4. The latch mechanism of claim 2, wherein when the first sliding member is located in the first locking position, the second sliding member and the first sliding member are spaced apart from each other by a distance.

5. The latch mechanism of claim 1, wherein the stopping portion is a stopping bump disposed on the first device and located in a moving path of the movement of the first sliding member in the first direction.

6. The latch mechanism of claim 1, wherein the second sliding member has a third locking hook, the second device has a fourth locking hook, and when the second sliding member is located in the second locking position in the first direction, the third locking hook is engaged with the fourth locking hook.

7. The latch mechanism of claim 6, wherein the third locking hook has a third guiding surface, the second device has a fourth guiding surface, and the third guiding surface and the fourth guiding surface are cooperate with each other, such that the second device is detached from the housing along a third direction perpendicular to the first direction.

8. The latch mechanism of claim 1, wherein the housing has a plurality of guiding pins, both of the first sliding member and the second sliding member have a respective locating slot, and the guiding pins are correspondingly settled in the locating slots of the first sliding member and the second sliding member, so as to restrict the movement of the first sliding member and the second sliding member relative to the housing along the first direction.

9. The latch mechanism of claim 1, wherein the first sliding member and the second sliding member are arranged in a row along the first direction and disposed between the first device and the second device.

10. The latch mechanism of claim 2, wherein after the second locking hook of the first sliding element disengages from the first locking hook of the first device, the first sliding member further pushes the second sliding element to move in the first direction.

* * * * *